D. MYERS.
Rotary Cultivator.
No. 52,496 Patented Feb. 6, 1866.
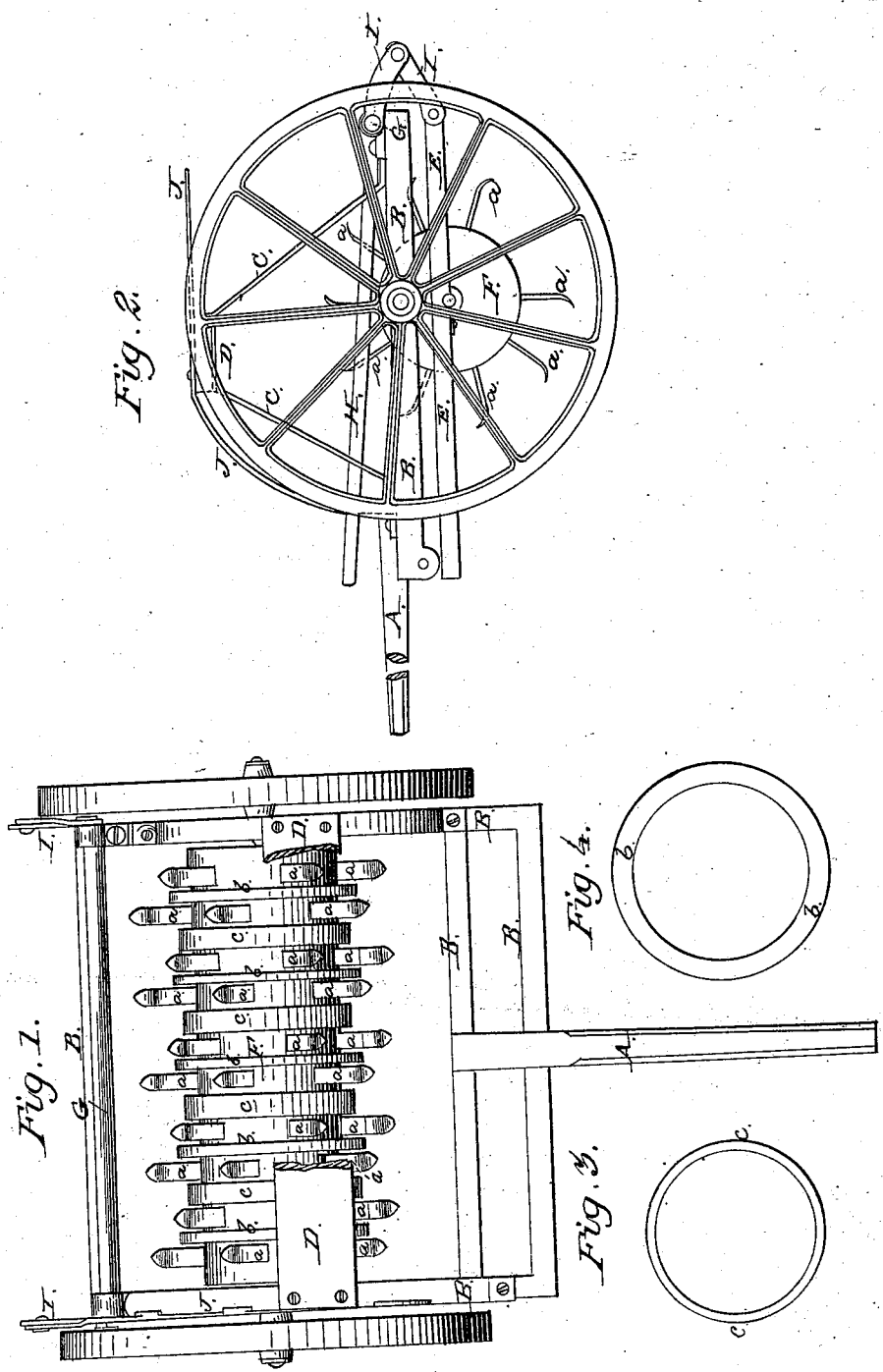

UNITED STATES PATENT OFFICE.

DAVID MYERS, OF CHICAGO, ILLINOIS, ASSIGNOR TO HIMSELF AND WM. H. KRETSINGER, OF SAME PLACE.

IMPROVEMENT IN ROTARY PLOWS.

Specification forming part of Letters Patent No. 52,496, dated February 6, 1866.

*To all whom it may concern:*

Be it known that I, DAVID MYERS, of Chicago, in the county of Cook and State of Illinois, have invented a new and useful Improvement in Rotary Plows; and I do hereby declare that the following is a full, clear, and exact description of the same, reference being had to the accompanying drawings, and to the letters and figures marked thereon, which form part of this specification.

The nature of my invention consists in arranging a series of rings upon or around the cylinder to which the plows or shovels are attached. Said rings, lying between consecutive series of plows or shovels and being entirely independent of said roller or cylinder, act in such a manner as to thoroughly clean off all the earth or soil which would otherwise adhere to the shovels and thus impair their successful operation, as will hereinafter be more fully and at large set forth.

To enable those skilled in the art to understand how to construct and use my invention, I will proceed to describe the same with particularity, making reference in so doing to the aforesaid drawings, in which—

Figure 1 represents a plan or top view of my invention, and Fig. 2 a side elevation of the same; and Figs. 3 and 4 are side views of the rings $b$ and $c$, hereinafter described.

Similar letters of reference in the different figures denote the same parts of my invention.

A represents the tongue or draft-pole, which may be attached to the frame of the machine, as shown, or in any other suitable manner.

B represents a rectangular frame, as shown, being provided upon each side with spindles for the wheels, which thus support said frame.

C C represent two braces or supports attached to said frame B, to sustain the seat D for the driver.

E represents a rectangular frame similar in construction to the frame B, and hinged to said frame B at its front end, as shown, upon and within which hinged frame is supported the cylinder F upon suitable journals and in suitable bearings at each end, as shown.

The rear end of the lower frame, E, is raised or lowered by means of the shaft G, lever H, and arms I, being adjusted and retained in any required position by entering the lever H in a series of recesses or rests in the arm J, which is readily effected by the driver from his seat.

$a$ represent the shovels or plows, which are rigidly attached to the revolving cylinder F, so that as it revolves the shovels $a$ successively enter the ground, and as the machine moves along throw up the earth in the rear of the cylinder.

Between the series of shovels, as shown, are arranged the rings $b$ and $c$, adapted respectively to narrow and wide spaces between the rows of shovels, for, the purpose of the rings being to clean the plows thoroughly, they must of necessity come in contact with the plows, and thus for narrow spaces a flat narrow ring like $b$ is used, while for wider spaces a thin broad ring like $c$ is employed. The rings being arranged loosely upon the cylinder, the earth will force the rings up against the under side of the cylinder, and thus will reach nearly to the ends of the plows above the cylinder, while the shape of the rings as thus arranged and adjusted cleans the shovels from their junction with the cylinder to their extreme points.

Having described the construction of my invention, I will now specify what I claim and desire to secure by Letters Patent:

The employment of a series of rings, in combination with the revolving cylinder F and shovels $a$, arranged and operating substantially as and for the purposes herein shown and described.

DAVID MYERS.

Witnesses:
W. E. MARRS,
L. JONES.